United States Patent
Li et al.

(10) Patent No.: US 8,797,775 B2
(45) Date of Patent: Aug. 5, 2014

(54) DRIVING CIRCUIT FOR LOW VOLTAGE DROP BRIDGE RECTIFIER AND METHOD THEREOF

(75) Inventors: Yike Li, Chengdu (CN); Changjiang Chen, Chengdu (CN); Rui Wang, Chengdu (CN)

(73) Assignee: Chengdu Monolithic Power Systems Co., Ltd., Chengdu (CN)

( * ) Notice: Subject to any disclaimer, the term of this patent is extended or adjusted under 35 U.S.C. 154(b) by 220 days.

(21) Appl. No.: 13/400,890

(22) Filed: Feb. 21, 2012

(65) Prior Publication Data

US 2012/0218797 A1      Aug. 30, 2012

(30) Foreign Application Priority Data

Feb. 24, 2011   (CN) .......................... 2011 1 0048130

(51) Int. Cl.
| H02M 7/155 | (2006.01) |
| H02M 7/217 | (2006.01) |
| H02M 1/08 | (2006.01) |
| H02M 7/162 | (2006.01) |
| H02M 7/17 | (2006.01) |

(52) U.S. Cl.
CPC ............... *H02M 1/08* (2013.01); *H02M 7/217* (2013.01)
USPC ............................ 363/126; 257/358; 327/363

(58) Field of Classification Search
USPC ........ 363/21.06, 21.14, 21.12, 125–127, 358, 363/363; 257/358; 327/363
See application file for complete search history.

(56) References Cited

U.S. PATENT DOCUMENTS

| 3,708,742 | A * | 1/1973 | Gunn ............................... 363/62 |
| 6,052,299 | A * | 4/2000 | Schieke ........................ 363/127 |
| 7,170,762 | B2 * | 1/2007 | Chian et al. ..................... 363/19 |
| 7,224,206 | B2 * | 5/2007 | Pappalardo et al. .......... 327/536 |
| 7,233,191 | B2 * | 6/2007 | Wang et al. .................... 327/430 |
| 7,236,041 | B2 | 6/2007 | Kim et al. |
| 8,068,321 | B2 | 11/2011 | Yang et al. |
| 8,102,680 | B2 | 1/2012 | Ren et al. |
| 2009/0285001 | A1 * | 11/2009 | Hu et al. ........................ 363/126 |
| 2010/0110595 | A1 * | 5/2010 | Yang et al. ...................... 361/56 |
| 2011/0006706 | A1 | 1/2011 | Zhang |
| 2011/0080761 | A1 * | 4/2011 | Kung ............................. 363/127 |
| 2011/0182095 | A1 | 7/2011 | Yang |

OTHER PUBLICATIONS

U.S. Appl. No. 13/251,067, filed Sep. 30, 2011, Joseph Urienza.

* cited by examiner

*Primary Examiner* — Adolf Berhane
*Assistant Examiner* — Nusrat Quddus
(74) *Attorney, Agent, or Firm* — Perkins Coie LLP

(57) ABSTRACT

The embodiments of the present circuit and method disclose a bridge rectifier and a driving circuit. The bridge rectifier having a first input, a second input, a first output, and a second output may comprise two high side diodes and two low side switches. The driving circuit may be coupled to the first input of the bridge rectifier and the second input of the bridge rectifier, and the driving circuit may be configured to provide a first driving signal and a second driving signal. The first driving signal may be coupled to a first low side switch and the second driving signal may be coupled to a second low side switch. The first driving signal may be limited to less than a first predetermined driving voltage and the second driving signal may be limited to less than a second predetermined driving voltage.

18 Claims, 4 Drawing Sheets

US 8,797,775 B2

DRIVING CIRCUIT FOR LOW VOLTAGE DROP BRIDGE RECTIFIER AND METHOD THEREOF

CROSS-REFERENCE TO RELATED APPLICATION(S)

This application claims the benefit of CN application No. 201110048130.9, filed on Feb. 24, 2011, and incorporated herein by reference.

TECHNICAL FIELD

This invention relates generally to electrical circuits, and more particularly but not exclusively to bridge rectifiers.

BACKGROUND

Bridge rectifiers are widely used in difference applications. A bridge rectifier is used to rectify an alternating current (AC) signal to a direct current (DC) signal. Conventional bridge rectifiers are shown in FIG. 1 and FIG. 2. FIG. 1 shows an example bridge rectifier 100 as a prior art. Bridge rectifier 100 comprises four diodes 101, 102, 103, and 104. Bridge rectifier 100 receives an AC signal through an input IN1 and an input IN2 and provides a rectified DC signal between an output OUT1 and an output OUT2. A capacitor C1 is coupled between output OUT1 and output OUT2. Capacitor C1 may be used to lessen a variation of the rectified output DC signal. FIG. 2 shows another bridge rectifier 200 as a prior art. Bridge rectifier 200 comprises four schottky diodes 201, 202, 203 and 204.

For high voltage application, voltage drops on the diodes are relatively small and have almost no influence on efficiency. However, for low voltage application, voltage drops on the diodes will result in a low efficiency. As a result, a bridge rectifier with lower voltage drop is needed to improve efficiency.

SUMMARY

In one embodiment, a bridge rectifier and a driving circuit are disclosed. The bridge rectifier having a first input, a second input, a first output, and a second output may comprise two high side diodes and two low side switches. The driving circuit may be coupled to the first input of the bridge rectifier and the second input of the bridge rectifier, and the driving circuit may be configured to provide a first driving signal and a second driving signal. The first driving signal may be coupled to a first low side switch and the second driving signal may be coupled to a second low side switch. The first driving signal may be limited to less than a first predetermined driving voltage and the second driving signal may be limited to less than a second predetermined driving voltage.

The use of the same reference label in different drawings indicates the same or like components.

DETAILED DESCRIPTION

In the present disclosure, numerous specific details are provided, such as examples of circuits, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Several embodiments of the present invention are described below with reference to driving circuit for bridge rectifier and associated method of operation. As used hereinafter, the term "couple" generally refers to multiple ways including a direct connection with an electrical conductor and an indirect connection through intermediate diodes, resistors, capacitors, and/or other intermediaries. The term "switch" generally refers to a semiconductor device composed of a semiconductor material with at least three terminals for connection to an external circuit.

Figure 1:
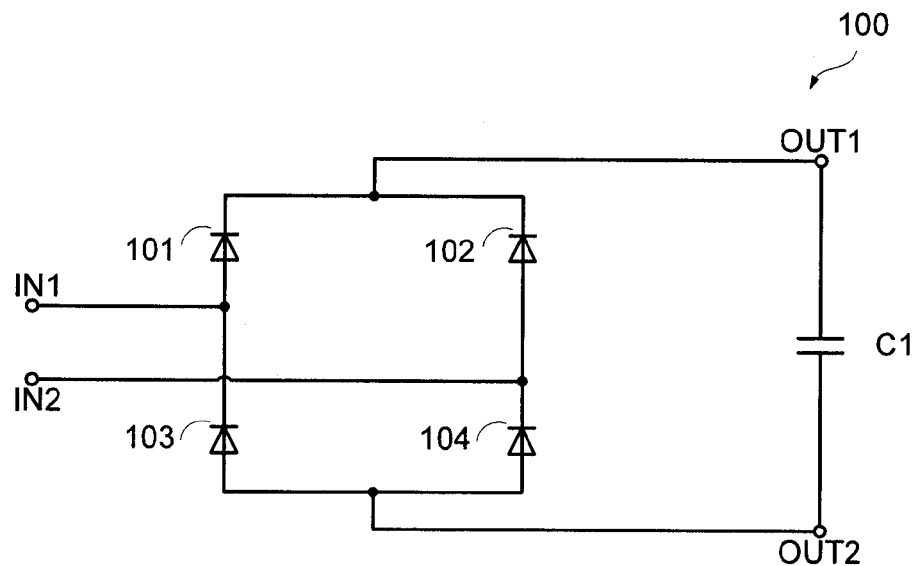
FIG. 1 illustrates a prior art bridge rectifier.
Figure 2:
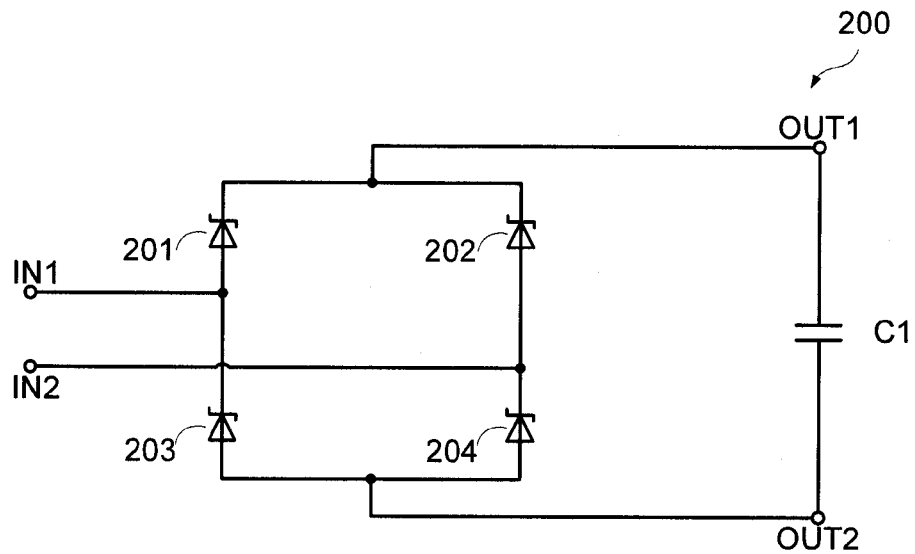
FIG. 2 illustrates another prior art bridge rectifier.
Figure 3:
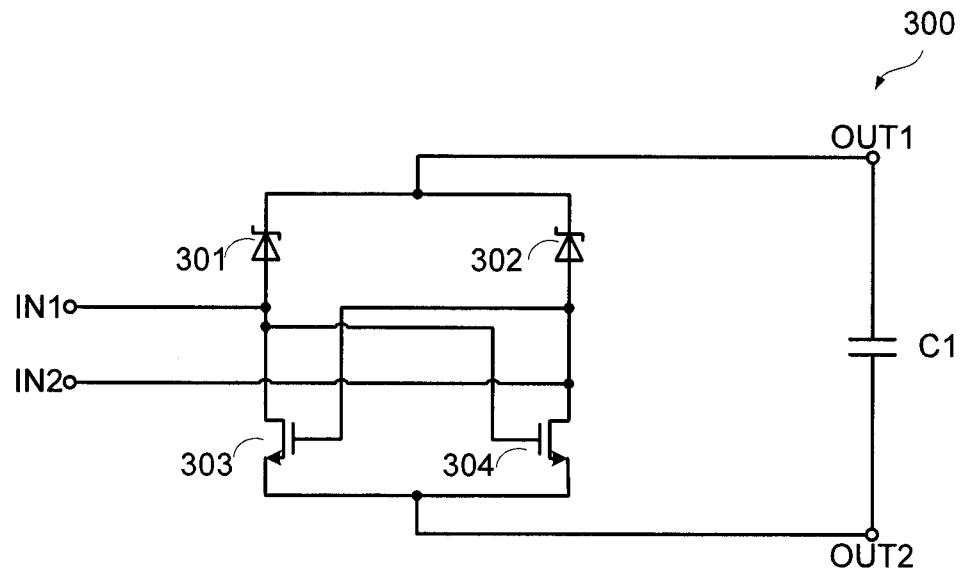
FIG. 3 schematically illustrates a bridge rectifier 300 in accordance with an embodiment of the present invention.

FIG. 3 schematically illustrates a bridge rectifier 300 in accordance with an embodiment of the present invention. Bridge rectifier 300 comprises a high side diode 301, a high side diode 302, a low side switch 303, and a low side switch 304. Persons of ordinary skill in the art will recognize, however, Bridge rectifier 300 may comprise more components, such as resistors, capacitors, diodes, or other electrical devices without detracting from the spirit of the present invention. In one embodiment, high side diode 301 and/or high side diode 302 may be schottky diode. Low side switch 303 and/or low side switch 304 may be metal-oxide semiconductor field effect transistor (MOSFET), junction field effect transistor (JFET), bipolar junction transistor (BJT), insulated gate bipolar translator (IGBT) or other types of transistor. In one embodiment, low side switch 303 is an N type MOSFET and low side switch 304 is an N type MOSFET as shown in FIG. 3. One of ordinary skill in the art will note that P type MOSFET may also be used as low side switch 303 and/or as low side transistor 304 without detracting from the merits of the present invention.

Bridge rectifier 300 is configured to receive an input AC signal through an input IN1 and an input IN2, and is configured to provide an output DC signal through an output OUT1 and an output OUT2. A capacitor C1 coupled between output OUT1 and output OUT2 may be employed to lessen the variation of the output DC signal. High side diode 301 is coupled between input terminal IN1 and output terminal OUT1. High side diode 302 is coupled between input IN2 and output OUT1. Low side switch 303 is coupled between input IN1 and output OUT2, a control terminal (gate) of low side switch 303 is coupled to input IN2. Low side switch 304 is coupled between input IN2 and output OUT2, a control terminal (gate) of low side switch 304 is coupled to input IN1. As shown in FIG. 3, a voltage at input IN2 is configured to provide power for driving low side switch 303 and a voltage at input IN1 is configured to provide power for driving low side switch 304.

High side diode 301 comprises an anode and a cathode. The anode of high side diode 301 is coupled to input IN1, and the cathode of high side diode 301 is coupled to output OUT1. In one embodiment, high side diode 301 comprises a schottky diode. High side diode 302 comprises an anode and a cathode. The anode of high side diode 302 is coupled to input IN2, and the cathode of high side diode 302 is coupled to output OUT1. In one embodiment, high side diode 302 comprises a schottky diode.

In one embodiment, low side switch 303 comprises an N type MOSFET. Low side MOSFET 303 comprises a source, a drain and a gate. The source of low side MOSFET 303 is coupled to output OUT2, the drain of low side MOSFET 303 is coupled to input IN1, and the gate of low side MOSFET 303 is coupled to input IN2. In one embodiment, low side switch 304 comprises an N type MOSFET. Low side MOSFET 304 comprises a source, a drain and a gate. The source of low side MOSFET 304 is coupled to output OUT2, the drain of low side MOSFET 304 is coupled to input IN2 and the gate of low side MOSFET 304 is coupled to input IN1.

Continuing with FIG. 3, when an input differential voltage between input IN1 and input IN2 is greater than an output differential voltage between output OUT1 and output OUT2, high side diode 301 is forward biased, and low side switch 304 is turned ON. As a result, current flows from input IN1 to output OUT1 through high side diode 301, and returns to input IN2 from output OUT2 via low side switch 304. When the input differential voltage between input IN2 and input IN1 is greater than the output differential voltage between output OUT1 and output OUT2, high side diode 302 is forward biased, and low side switch 303 is turned ON. As a result, current flows from input IN2 to output OUT1 through high side diode 302, and returns to input IN1 from output OUT2 via low side switch 303.

When high side diode 301 is forward biased, if there is very low conductive resistance of low side switch 304, voltage drop on bridge rectifier 300 may be almost a voltage drop on high side diode 301. When high side diode 302 is forward biased, if there is very low conductive resistance of low side switch 303, voltage drop on bridge rectifier 300 may be almost a voltage drop on high side diode 302. As a result, the voltage drop on bridge rectifier 300 is much lower than bridge rectifier 100 or bridge rectifier 200, and efficiency of bridge rectifier 300 is improved obviously at low voltage application.

When bridge rectifier 300 is integrated on a chip, the gate oxide of the control terminal of low side switch 303 and the gate oxide of the control terminal of low side switch 304 are made thinner for better conductive resistance performance, i.e., lower conductive resistance. As a result, voltage applied at the control terminal of low side switch 303 and voltage applied at the control terminal of low side switch 304 should be limited. Take MOSFET for example, a gate-to-source bias voltage VGS should be limited to less than the VGS breakdown voltage. As a result, when bridge rectifier 300 is integrated on one chip, if the differential voltage between input IN1 and input IN2 is greater than the VGS breakdown voltage of low side MOSFET 304, voltage at input IN1 can not be directly connected to the gate of low side MOSFET 304, and if the differential voltage between input IN2 and input IN1 is greater than the VGS breakdown voltage of low side MOSFET 303, voltage at input IN2 can not be directly connected to the gate of low side MOSFET 303. To solve this issue, FIG. 4 and FIG. 5 illustrate a driving circuit coupled between input IN1, input IN2 and the control terminals of the low side switches.

Figure 4:
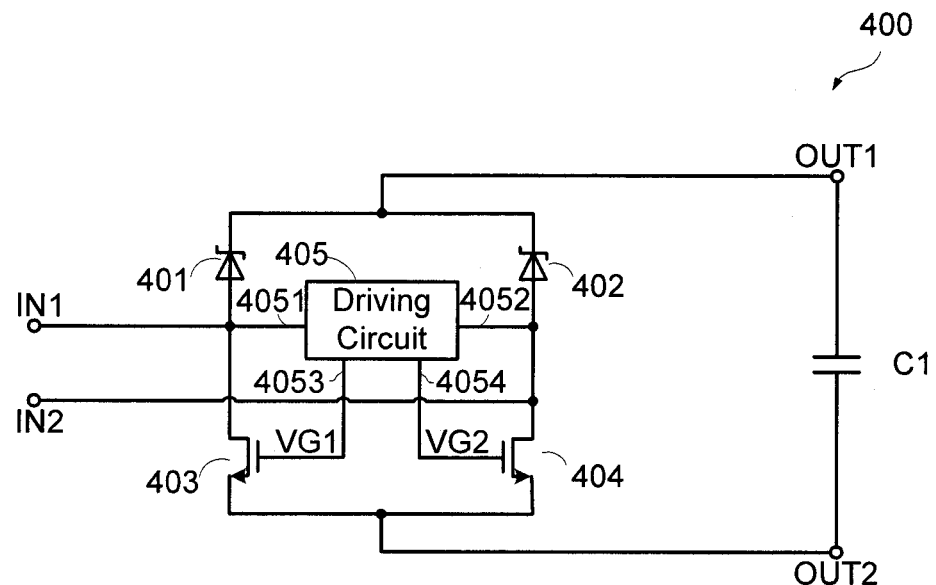
FIG. 4 schematically illustrates a block diagram of a circuit 400 including a bridge rectifier circuit and a driving circuit in accordance with an embodiment of the present invention.
Figure 5:
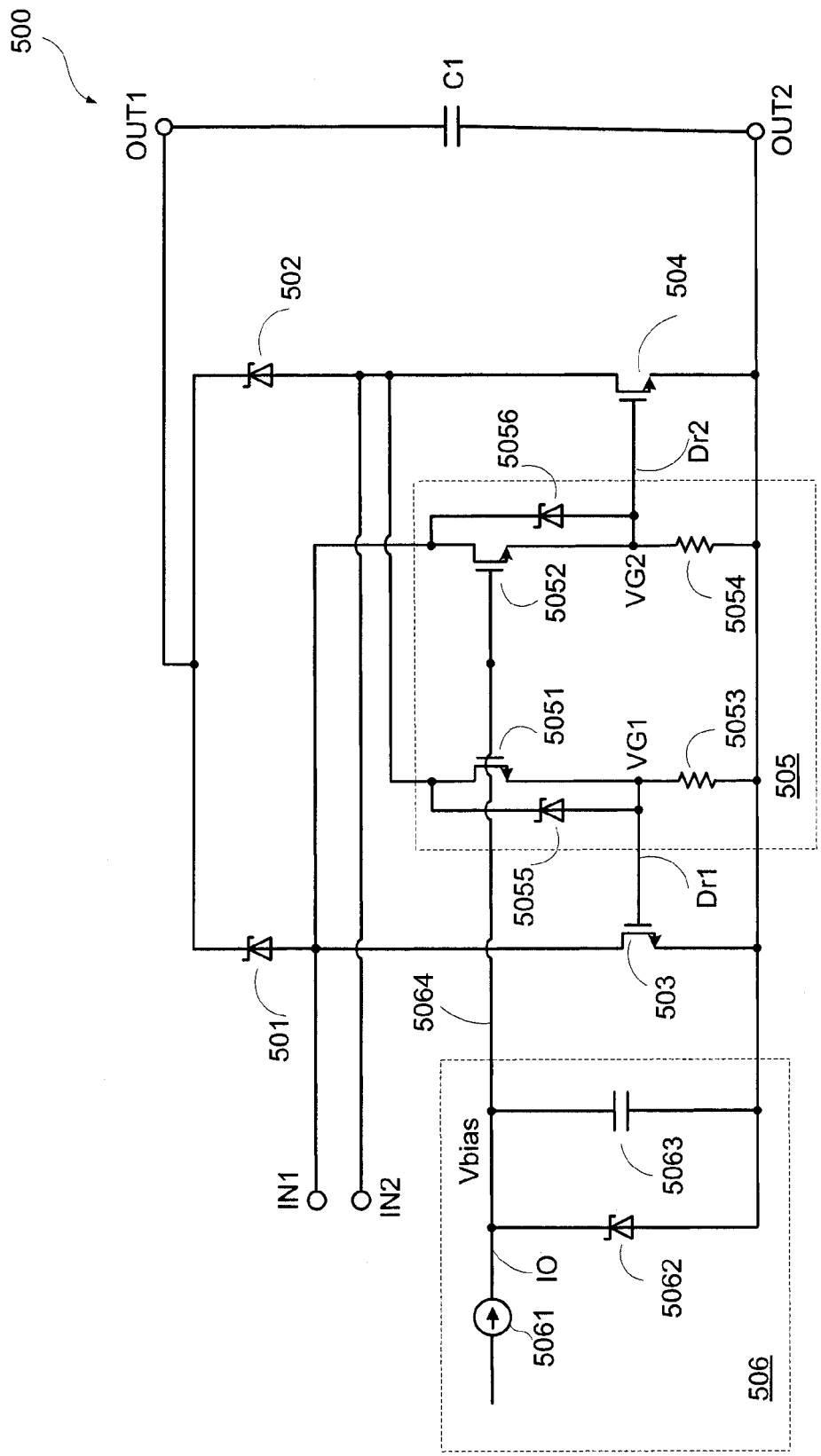
FIG. 5 schematically illustrates a circuit 500 including a bridge rectifier circuit and a driving circuit in accordance with an embodiment of the present invention.

FIG. 4 schematically illustrates a block diagram of circuit 400 of bridge rectifier circuit and its driving circuit in accordance with an embodiment of the present invention. Circuit 400 comprises a bridge rectifier and a driving circuit 405.

The bridge rectifier comprises a high side diode 401, a high side diode 402, a low side metal oxide semiconductor field effect transistor (MOSFET) 403, and a low side MOSFET 404. The low side MOSFET 403 and the low side MOSFET 404 can be either N type or P type. Other types of switches such as bipolar junction transistor ("BJT") or junction field effect transistor ("JFET") can also be adopted. High side diode 401 is coupled between input IN1 and output OUT1. High side diode 402 is coupled between input IN2 and output OUT1. Low side MOSFET 403 is coupled between input IN1 and output OUT2. Low side switch 404 is coupled between input IN2 and output OUT2. High side diode 401 comprises an anode coupled to input IN1 and a cathode coupled to output OUT1. High side diode 402 comprises an anode coupled to input IN2 and a cathode coupled to output OUT1. Low side MOSFET 403 comprises a source coupled to output OUT2, a drain coupled to input IN1 and a gate coupled to driving circuit 405. Low side MOSFET 404 comprises a source coupled to output OUT2, a drain coupled to input IN2 and a gate coupled to driving circuit 405.

Driving circuit 405 has an input 4051 coupled to input IN1 of the bridge rectifier and an input 4052 coupled to input IN2 of the bridge rectifier. Driving circuit 405 has an output 4053 configured to provide a driving signal VG1 coupled to the gate of low side MOSFET 403 and driving circuit 405 has an output 4054 configured to provide a driving signal VG2 coupled to the gate of low side MOSFET 404. In one embodiment, voltage at input IN1 is configured to provide power to driving signal VG2 and voltage at input IN2 is configured to provide power to driving signal VG1. In one embodiment, driving signal VG1 is limited to less than a first predetermined driving voltage and driving signal VG2 is limited to less than a second predetermined driving voltage. The first predetermined driving voltage should be less than the gate oxide breakdown voltage (VGS breakdown voltage) of low side MOSFET 403. Similarly, the second predetermined driving voltage should be less than a gate oxide breakdown voltage (VGS breakdown voltage) of low side MOSFET 404.

Switching devices may be employed to provide driving signal VG1 and/or driving signal VG2. In one embodiment, driving circuit 405 comprises a first driving switch and a second driving switch. The first driving switch comprises a control terminal, a first terminal coupled to input IN2 and a second terminal coupled to provide driving signal VG1, and the second driving switch comprises a control terminal, a first terminal coupled to input IN1 and a second terminal couple to provide driving signal VG2.

The first predetermined driving voltage is responsive to a threshold voltage Vth1 of the first driving switch and a voltage at control terminal of the first driving switch. The second predetermined driving voltage is responsive to a threshold voltage Vth2 of the second driving switch and a voltage at control terminal of the second driving switch. The term "threshold voltage" of a switch is generally defined as a control voltage (e.g., VGS for MOSFET) to allow flow of electrons through a junction between the control terminal to the second terminal (e.g., gate-source junction for MOSFET). In one embodiment, a bias voltage is coupled to the control terminal of the first driving switch and the control terminal of the second driving switch. The bias voltage is configured to control a conductive status of the first driving switch and a conductive status of the second driving switch. In other embodiments, the control terminal of the first driving switch is coupled to a first bias voltage and the control terminal of the second driving switch is coupled to a second bias voltage.

FIG. 5 schematically illustrates a circuit 500 of a bridge rectifier circuit and its driving circuit in accordance with an embodiment of the present invention. Circuit 500 comprises a bridge rectifier and a driving circuit 505.

Same as shown circuit 400, the bridge rectifier comprises a high side diode 501, a high side diode 502, a low side MOSFET 503, and a low side MOSFET 504.

Driving circuit 505 has a first input coupled to input IN1 of the bridge rectifier, a second input coupled to input IN2 of the bridge rectifier, an output Dr1 coupled to the gate of low side MOSFET 503, and an output Dr2 coupled to the gate of low side MOSFET 504. Driving circuit 505 comprises a driving switch 5051 and a driving switch 5052. Driving switch 5051 has a control terminal, a first terminal coupled to input IN2 of the bridge rectifier, and a second terminal coupled to the gate of low side MOSFET 503. Driving switch 5051 is configured to provide a driving signal VG1 at its second terminal. Driving switch 5052 has a control terminal, a first terminal coupled to input IN1 of the bridge rectifier, and a second terminal coupled to the gate of low side MOSFET 504. Driving switch 5052 is configured to provide a driving signal VG2 at its second terminal.

Driving signal VG1 is limited to less than a first predetermined driving voltage and driving signal VG2 is limited to less than a second predetermined driving voltage. In one embodiment, control terminal of driving switch 5051 and control terminal of driving switch 5052 are coupled to receive a bias voltage Vbias at node 5064. The first predetermined driving voltage is responsive to bias voltage Vbias and a threshold voltage of driving switch 5051, and the second predetermined driving voltage is responsive to bias voltage Vbias and a threshold voltage of driving switch 5052. In other embodiments, control terminal of driving switch 5051 is coupled to a first bias voltage and control terminal of driving switch 5052 is coupled to a second bias voltage. The first predetermined driving voltage is responsive to the first bias voltage and a threshold voltage of driving switch 5051, and the second predetermined driving voltage is responsive to the second bias voltage and a threshold voltage of driving switch 5052.

In one embodiment, driving switch 5051 is N type MOSFET as shown in FIG. 5. MOSFET 5051 comprises a gate coupled to bias voltage Vbias, a drain coupled to input IN2 of the bridge rectifier, and a source coupled to the gate of low side MOSFET 503. A pull down resistor 5053 may be coupled between the source of MOSFET 5051 and output OUT2 of the bridge rectifier. In one embodiment, driving switch 5052 is N type MOSFET as shown in FIG. 5. MOSFET 5052 comprises a gate coupled to bias voltage Vbias, a drain coupled to input IN1 of the bridge rectifier, and a source coupled to the gate of low side MOSFET 504. A pull down resistor 5054 may be coupled between the source of MOSFET 5052 and output OUT2 of the bridge rectifier.

When voltage at input IN2 of the bridge rectifier is lower than the first predetermined driving voltage, e.g., comprising subtracting threshold voltage Vth1 of MOSFET 5051 from bias voltage Vbias (i.e., Vbias−Vth1), MOSFET 5051 is served as a pass device and MOSFET 5051 works in the linear region and operates like a resistor. As a result, voltage of driving signal VG1 will follow the voltage at input IN2 of the bridge rectifier. When voltage at input IN2 of the bridge rectifier is higher than the first predetermined driving voltage, e.g., Vbias−Vth1, MOSFET 5051 works in the saturation region and the voltage of driving signal VG1 is latched and will not increase with the voltage at input IN2 of the bridge rectifier. In one embodiment, driving signal VG1 may be limited to less then the first predetermined driving voltage, e.g., Vbias−Vth1. Driving switch 5051 may comprise other types of switch, for example, JFET, BJT or IGBT.

When voltage at input IN1 of the bridge rectifier is lower than a second predetermined driving voltage, e.g., comprising subtracting threshold voltage Vth2 of MOSFET 5052 from bias voltage Vbias (i.e., Vbias−Vth2), MOSFET 5052 is served as a pass device and MOSFET 5052 works in the linear region and operates like a resistor. As a result, voltage of driving signal VG2 will follow the voltage at input IN1 of the bridge rectifier. When voltage at input IN1 of the bridge rectifier is higher than the second predetermined driving voltage, e.g., Vbias−Vth2, MOSFET 5052 works in the saturation region and voltage of driving signal VG2 is latched and will not increase with the voltage at input IN1 of the bridge rectifier. Driving signal VG2 may be limited to less than the second predetermined driving voltage, e.g., Vbias−Vth2. Driving switch 5052 may comprise other types of switch, for example, JFET, BJT or IGBT.

In one embodiment, when voltage at input IN2 of the bridge rectifier is larger than the first predetermined driving voltage, and driving signal VG1 is limited to the first predetermined driving voltage. And when voltage at input IN2 of the bridge rectifier is lower than the first predetermined driving voltage, voltage of driving signal VG1 is almost the same as the voltage at input IN2 of the bridge rectifier. In one embodiment, when the voltage at input IN1 is larger than the second predetermined driving voltage, and driving signal VG2 is limited to the second predetermined driving voltage. And when voltage at input IN1 of the bridge rectifier is lower than the second predetermined driving voltage, the voltage of driving signal VG2 is almost the same as the voltage at input IN1 of the bridge rectifier.

In one embodiment, driving circuit 505 further comprises a diode 5055 coupled to MOSFET 5051 in parallel, and a diode 5056 coupled to MOSFET 5052 in parallel. Diode 5055 comprises an anode coupled to the source of MOSFET 5051, and a cathode coupled to the drain of MOSFET 5051. Diode 5056 comprises an anode coupled to the source of MOSFET 5052, and a cathode coupled to first terminal of driving switch 5052.

Circuit 500 may further comprise a voltage generator 506. Voltage generator 506 comprises a current source 5061 and a Zener diode 5062. Current source 5061 is configured to provide an output current at node IO. Zener diode 5062 has an anode and a cathode. The cathode of Zener diode 5062 is coupled to node IO, and is configured to provide bias voltage Vbias. The anode of Zener diode 5062 is coupled to output OUT2 of the bridge rectifier. Voltage generator 506 may further comprises a capacitor 5063 having a first terminal coupled to cathode of Zener diode 5062 and a second terminal coupled to anode of Zener diode 5062. In other embodiments, charge pump or other regulators may be employed to provide bias voltage Vbias.

Figure 6:
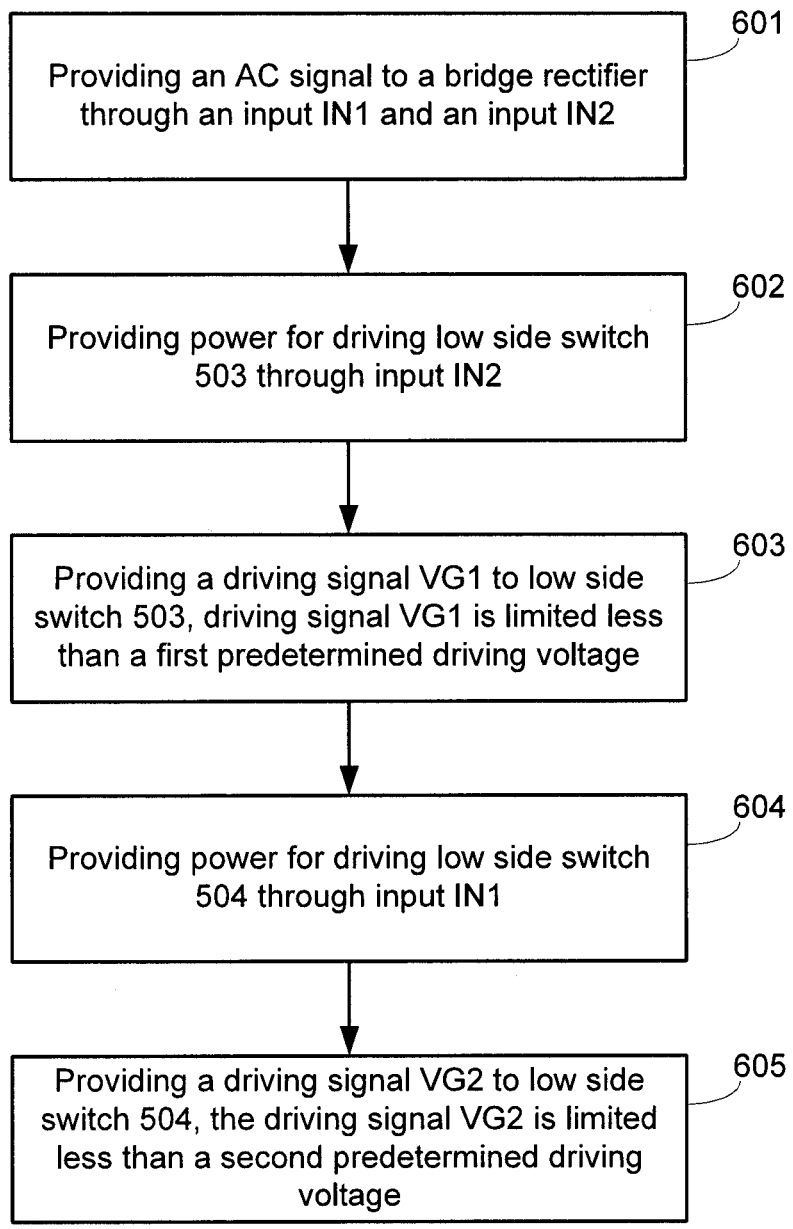
FIG. 6 is a block diagram illustrating a method for driving a bridge rectifier in accordance with one embodiment of the present invention.

FIG. 6 is a block diagram illustrating a method for driving a bridge rectifier in accordance with one embodiment of the present invention.

The method for driving the bridge rectifier is described below referring with FIG. 5 and FIG. 6. At stage 601, providing an AC signal to the bridge rectifier through an input IN1 and an input IN2. At stage 602, providing power for driving low side switch 503 through input IN2. Voltage at input IN2 is configured to drive low side switch 503. At stage 603, providing a driving signal VG1 to low side switch 503, driving signal VG1 is limited less than a first predetermined driving voltage. Driving signal VG1 is coupled to control terminal of low side switch 503 through a driving switch 5051. At stage 604, providing power for driving low side switch 504 through input IN1. Voltage at input IN1 is configured to drive low side switch 504. At stage 605, providing a driving signal VG2 to low side switch 504, driving signal VG2 is limited less than a second predetermined driving voltage. Driving signal VG2 is coupled to control terminal of low side switch 504 through a driving switch 5052.

In one embodiment, driving signal VG1 is provided through driving switch 5051. And the first predetermined driving voltage is responsive to a threshold voltage Vth1 of driving switch 5051. In one embodiment, driving signal VG2 is provided through driving switch 5052. And the second predetermined driving voltage is responsive to a threshold voltage Vth2 of driving switch 5052.

In one embodiment, a control terminal of driving switch 5051 is configured to receive a bias voltage Vbias. In one embodiment, a control terminal of driving switch 5051 is configured to receive bias voltage Vbias. In one embodiment, the first predetermined driving voltage comprises subtracting threshold voltage Vth1 from bias voltage Vbias. In one embodiment, the second predetermined driving voltage comprises subtracting threshold voltage Vth2 from bias voltage Vbias.

In one embodiment, when voltage at input IN2 is lower than the first predetermined driving voltage, e.g., Vbias−Vth1, driving switch 5051 is served as a pass device. As a result, voltage of driving signal VG1 will follow the voltage at input IN2. When voltage at input IN2 is higher than the first predetermined driving voltage, e.g., Vbias−Vth1, driving switch 5051 works in saturation region and voltage of driving signal VG1 is latched and will not increase with the voltage at input IN2. Driving signal VG1 may be limited less than the first predetermined driving voltage. In one embodiment, when voltage at input IN1 is lower than the second predetermined driving voltage, e.g., Vbias−Vth2, driving switch 5052 is served as a pass device. As a result, voltage of driving signal VG2 will follow the voltage at input IN1. When voltage at input IN1 is higher than the second predetermined driving voltage, e.g., Vbias−Vth2, driving switch 5052 works in saturation region and voltage of driving signal VG2 is latched and will not increase with the voltage at input IN1. Driving signal VG2 may be limited less than the second predetermined driving voltage.

The above description and discussion about specific embodiments of the present technology is for purposes of illustration. However, one with ordinary skill in the relevant art should know that the invention is not limited by the specific examples disclosed herein. Variations and modifications can be made on the apparatus, methods and technical design described above. Accordingly, the invention should be viewed as limited solely by the scope and spirit of the appended claims.

We claim:

1. A circuit, comprising:
 a bridge rectifier, having a first input, a second input, a first output, and a second output, wherein the bridge rectifier comprises a first high side diode, a second high side diode, a first low side switch and a second low side switch, wherein the first high side diode has an anode coupled to the first input of the bridge rectifier and a cathode coupled to the first output of the bridge rectifier, wherein the second high side diode has an anode coupled to the second input of the bridge rectifier and a cathode coupled to the first output of the bridge rectifier, wherein the first low side switch has a control terminal, a first terminal coupled to the first input of the bridge rectifier and a second terminal coupled to the second output of the bridge rectifier, and wherein the second low side switch has a control terminal, a first terminal coupled to the second input of the bridge rectifier and a second terminal coupled to the second output of the bridge rectifier; and
 a driving circuit, having a first input coupled to the first input of the bridge rectifier, a second input coupled to the second input of the bridge rectifier, a first output coupled to the control terminal of the first low side switch, and a second output coupled to the control terminal of the second low side switch, wherein the first output of the driving circuit is configured to provide a first driving signal, wherein the second output of the driving circuit is configured to provide a second driving signal, wherein the first driving signal is limited to less than a first predetermined driving voltage, and wherein the second driving signal is limited to less than a second predetermined driving voltage.

2. The circuit of claim 1, wherein the driving circuit further comprises:
 a first driving switch, having a control terminal, a first terminal coupled to the second input of the bridge rectifier, and a second terminal coupled to the control terminal of the first low side switch, wherein the second terminal is configured to provide the first driving signal; and
 a second driving switch, having a control terminal, a first terminal coupled to the first input of the bridge rectifier, and a second terminal coupled to the control terminal of the second low side switch, wherein the second terminal is configured to provide the second driving signal.

3. The circuit of claim 2, further comprising a voltage generator, the voltage generator having an output configured to provide a bias voltage, wherein the control terminal of the first driving switch is coupled to receive the bias voltage, and wherein the control terminal of the second driving switch is coupled to receive the bias voltage.

4. The circuit of claim 3, wherein the voltage generator comprises:
 a current source, having an output configured to provide a current; and
 a Zener diode, having an anode coupled to the second output of the bridge rectifier and a cathode coupled to the output of the current source, wherein the current is configured to flow through the Zener diode from the cathode to the anode, and wherein the cathode of the Zener diode is configured to provide the bias voltage.

5. The circuit of claim 2, wherein the driving circuit further comprises a third input configured to receive a bias voltage, wherein the control terminal of the first driving switch is coupled to the third input of the driving circuit, and wherein the first predetermined driving voltage is responsive to the bias voltage.

6. The circuit of claim 2, wherein the driving circuit further comprises a third input configured to receive a bias voltage, and wherein the control terminal of the second driving switch is coupled to the third input of the driving circuit, and wherein the second predetermined driving voltage is responsive to the bias voltage.

7. The circuit of claim 2, wherein the first driving switch comprises a first driving metal-oxide semiconductor field effect transistor (MOSFET), having a gate terminal, a source terminal coupled to the control terminal of the first low side switch, and a drain terminal coupled to the second input of the bridge rectifier; and wherein the second driving switch comprises a second driving MOSFET, having a gate terminal, a source terminal coupled to the control terminal of the second low side switch, and a drain terminal coupled to the first input of the bridge rectifier.

8. The circuit of claim 7, further comprising:
a first diode, having an anode and a cathode, wherein the anode is coupled to the source terminal of the first driving MOSFET, and wherein the cathode is coupled to the drain terminal of the first driving MOSFET; and
a second diode, having an anode and a cathode, wherein the anode is coupled to the source terminal of the second driving MOSFET, and wherein the cathode is coupled to the drain terminal of the second driving MOSFET.

9. The circuit of claim 1, wherein the bridge rectifier further comprising:
a current source, having an output configured to provide a current;
a Zener diode, having an anode coupled to the second output of the bridge rectifier and a cathode coupled to the output of the current source, wherein the current is configured to flow through the Zener diode from the cathode to the anode, and wherein the cathode is configured to provide a bias voltage;
a first driving switch, having a first terminal coupled to the second input of the bridge rectifier, a second terminal coupled to the control terminal of the first low side switch, and a control terminal coupled to receive the bias voltage, wherein the first predetermined driving voltage is responsive to the bias voltage; and
a second driving switch, having a first terminal coupled to the first input of the bridge rectifier, a second terminal coupled to the control terminal of the second low side switch, and a control terminal coupled to receive the bias voltage, wherein the second predetermined driving voltage is responsive to the bias voltage.

10. The circuit of claim 9, wherein the circuit is integrated onto an integrated circuit.

11. A method for driving a bridge rectifier, comprising:
providing an AC signal to the bridge rectifier through a first input and a second input;
providing power for driving a first low side switch through the second input;
providing a first driving signal to the first low side switch, wherein the first driving signal is limited to less than a first predetermined driving voltage;
providing power for driving a second low side switch through the first input; and
providing a second driving signal to the second low side switch, wherein the second driving signal is limited to less than a second predetermined driving voltage and wherein the first driving signal equals the first predetermined driving voltage when a voltage at the second input is higher than the first predetermined driving voltage.

12. The method of claim 11, wherein the second driving signal equals the second predetermined driving voltage when the voltage at the first input is higher than the second predetermined driving voltage.

13. The method of claim 11, further comprising:
providing the first driving signal via a first driving switch having a control terminal, wherein the first predetermined driving voltage is responsive to a voltage at the control terminal of the first driving switch; and
providing the second driving signal via a second driving switch having a control terminal, wherein the second predetermined driving voltage is responsive to a voltage at the control terminal of the second driving switch.

14. The method of claim 11, further comprising a bias voltage, wherein the first predetermined driving voltage is responsive to the bias voltage, and wherein the second predetermined driving voltage is responsive to the bias voltage.

15. The method of claim 14, further comprising:
providing the first driving signal via a first driving switch, wherein a control terminal of the first driving switch is coupled to the bias voltage; and
providing the second driving signal via a second driving switch, wherein a control terminal of the second driving switch is coupled to the bias voltage.

16. A driving circuit for a bridge rectifier comprising a first low side switch and a second low side switch, comprising:
a first output terminal, configured to provide a first driving signal coupled to a control terminal of the first low side switch, and wherein the first driving signal is limited to less than a first predetermined driving voltage;
a second output terminal, configured to provide a second driving signal coupled to a control terminal of the second low side switch, and wherein the second driving signal is limited to less than a second predetermined driving voltage;
a first driving switch, having a control terminal, a first terminal coupled to a first input of the bridge rectifier, and a second terminal configured to provide the first driving signal; and
a second driving switch, having a control terminal, a first terminal coupled to a second input of the bridge rectifier, and a second terminal configured to provide the second driving signal;
wherein the first predetermined driving voltage is responsive to a voltage at the control terminal of the first driving switch; and
wherein the second predetermined driving voltage is responsive to a voltage at the control terminal of the second driving switch and wherein the driving circuit further comprising a bias voltage, wherein the control terminal of the first driving switch is coupled to receive the bias voltage, and wherein the control terminal of the second driving switch is coupled to receive the bias voltage.

17. The driving circuit of claim 16, further comprising:
a current source, having an output configured to provide a current; and
a Zener diode, having an anode and a cathode coupled to the output of the current source, wherein the current is configured to flow through the Zener diode from the cathode to the anode, and wherein the cathode of the Zener diode is configured to provide the bias voltage.

18. The driving circuit of claim 16, further comprising:
a first diode, having an anode and a cathode, wherein the anode is coupled to the second terminal of the first driving switch, and wherein the cathode is coupled to the first terminal of the first driving switch; and
a second diode, having an anode and a cathode, wherein the anode is coupled to the second terminal of the second driving switch, and wherein the cathode is coupled to the first terminal of the second driving switch.

* * * * *